United States Patent [19]
Munari

[11] Patent Number: 6,079,590
[45] Date of Patent: Jun. 27, 2000

[54] GRIP DEVICE FOR A FOOD COOKING VESSEL, IN PARTICULAR A FRYING-PAN

[75] Inventor: Francesco Munari, Cardano Al Campo, Italy

[73] Assignee: La Termoplastic F.B.M. S.r.l., Italy

[21] Appl. No.: 09/275,770

[22] Filed: Mar. 25, 1999

[30] Foreign Application Priority Data

Mar. 27, 1998 [IT] Italy .................................. TO98A0274

[51] Int. Cl.[7] .................................................. B65D 25/00
[52] U.S. Cl. ......................... 220/762; 220/753; 220/759
[58] Field of Search .................................. 220/762, 764, 220/766, 753, 759, 573.1

[56] References Cited

U.S. PATENT DOCUMENTS

| | | | |
|---|---|---|---|
| 349,199 | 9/1886 | Baker | 220/753 |
| 1,480,356 | 1/1924 | Wegener et al. | 220/764 X |
| 2,205,819 | 6/1940 | Mattoon | 220/753 |
| 4,593,833 | 6/1986 | Hill | 220/759 |
| 4,874,109 | 10/1989 | Cook | 220/759 X |
| 5,887,751 | 3/1999 | Kroscher | 220/573.1 X |

FOREIGN PATENT DOCUMENTS

| | | |
|---|---|---|
| 0247229 | 12/1987 | European Pat. Off. . |
| 0809962 | 12/1997 | European Pat. Off. . |
| 1193654 | 5/1965 | Germany . |

OTHER PUBLICATIONS

EPO Search Report. Dated Jul. 12, 1999.

*Primary Examiner*—Steven Pollard
*Attorney, Agent, or Firm*—Liniak, Berenato, Longacre & White

[57] ABSTRACT

A grip device for a food cooking vessel, in particular a frying-pan, having a root portion connected integrally to the vessel (e.g. by means of screws of rivets), and a grip portion defined by a one-piece element and rotatable as a whole, with respect to the root portion and therefore with respect to the vessel, about a predetermined axis of rotation and in one predetermined rotation direction ; the grip portion may be rotated, with respect to the root portion, towards the vessel to reduce the overall size of the vessel; and locking means ensure that, in use, the grip portion is maintained in a stable work position with respect to the root portion.

10 Claims, 4 Drawing Sheets

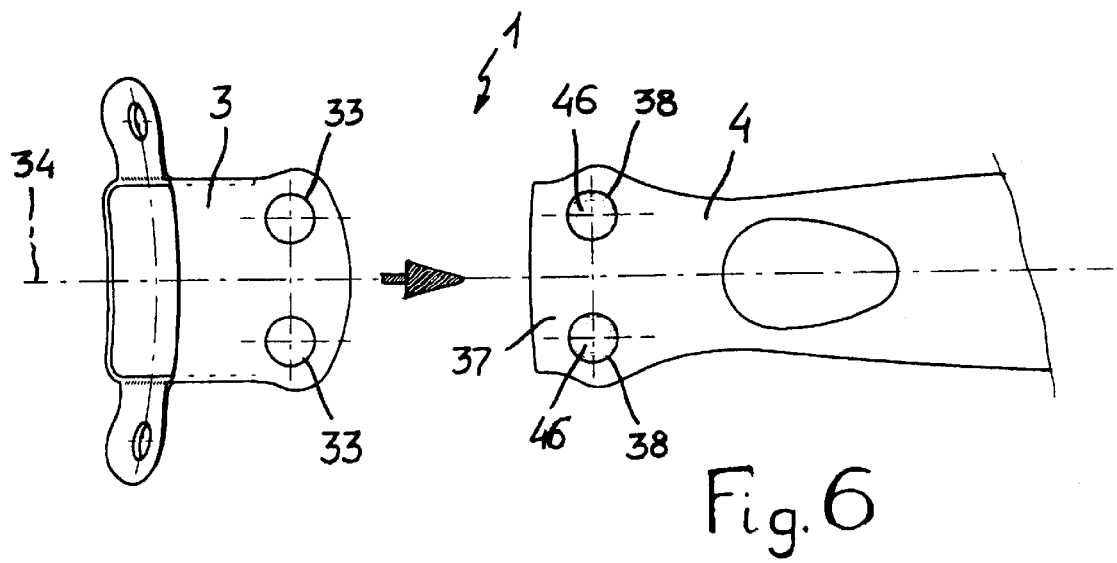
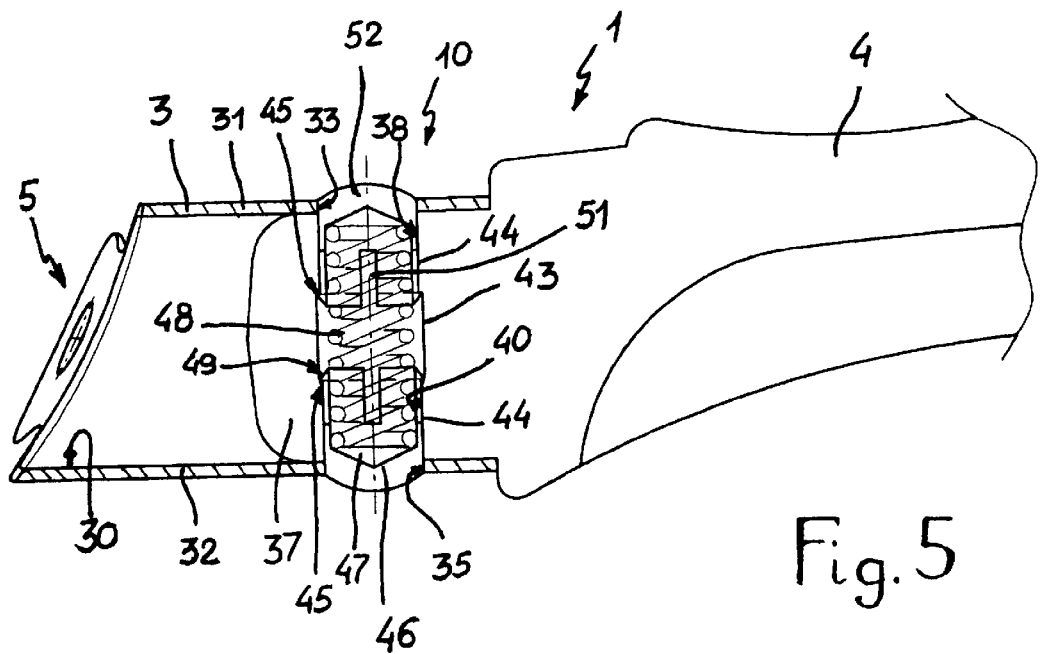

GRIP DEVICE FOR A FOOD COOKING VESSEL, IN PARTICULAR A FRYING-PAN

The present invention relates to an improved grip device for a food cooking vessel, in particular a frying-pan.

BACKGROUND OF THE INVENTION

Most conventional food cooking vessels (such as frying-pans, saucepans, etc.) have grips or handles enabling the vessel to be gripped even when hot. In particular, frying-pans (by which are meant cooking vessels with low lateral walls with respect to the diameter of the vessel) normally comprise elongated handles, normally made of polymer material, which project radially from and are fitted, e.g. screwed or riveted, to the lateral wall of the pan.

Frying-pans with traditional handles are of considerable overall width, precisely on account of the handle, which may even be of a length comparable to the diameter of the pan itself. The overall size of frying-pans (or other similar vessels) is a problem not only for makers, distributors and retailers (e.g. in terms of transport and storage), but also for users, both when the pans are not in use (e.g. difficulty fitting the pans inside cupboards or dish-washing machines) and in actual use, in which case the handles may prevent simultaneous use of a number of vessels on the same cooking range. Moreover, the handles, particularly those projecting from the range, may be knocked accidentally, thus tipping over the pan and possibly resulting in serious injury to the user.

SUMMARY OF THE INVENTION

It is an object of the present invention to provide a grip device for food cooking vessels, in particular frying-pans, which, while fully effective (enabling safe, troublefree grip) during use of the vessel, provides for reducing the overall size of the vessel when gripping is not required, and which at the same time is straightforward and cheap to produce.

According to the present invention, there is provided a grip device for a food cooking vessel, in particular a frying-pan, comprising a root portion and a grip portion, said root portion having connecting means for connection to said vessel and which integrally connect said root portion and said vessel; characterized by also comprising hinge means between said root portion and said grip portion, for enabling rotation of said rip portion with respect to said root portion about a predetermined axis of rotation; said grip portion being defined by a one-piece element; the entire said grip portion rotating as a whole with respect to said root portion about said predetermined axis of rotation; and said rotation of said grip portion with respect to said root portion about said predetermined axis of rotation occurring entirely outside said vessel.

More specifically, said hinge means permit said rotation of said grip portion, with respect to said root portion, from a work position in which said grip portion has a first predetermined inclination with respect to said root potion, to a rest position in which said grip portion has a second predetermined inclination with respect to said root portion.

The grip device according to the present invention preferably also comprises locking means for connecting said grip portion integrally to said root portion in said work position; and control means for controlling said locking means.

The grip device according to the invention therefore provides, in the extended work position, for effectively gripping the vessel to which it is fitted, but may also be folded into a rest position to significantly reduce the overall width of the vessel. Clearly, the grip device may advantageously be folded, for example, when transporting or storing the vessel to which it is fitted; and the grip portion of the device may be folded by the user to save cupboard space when the vessel is not in use, or to prevent the grip portion from projecting dangerously from the cooking range. Moreover, switching from the rest to the work position and vice versa is extremely fast and simple, requiring only one manual operation on the part of the user.

BRIEF DESCRIPTION OF THE DRAWINGS

A number of non-limiting embodiments of the present invention will be described by way of example with reference to the accompanying drawings, in which:

FIG. 5 shows a partially sectioned side view of a further variation of the grip device according to the invention;

FIGS. 6 to 8 show schematic plan views illustrating operation of the FIG. 5 variation.

DETAILED DESCRIPTION OF THE INVENTION

Figure 1:
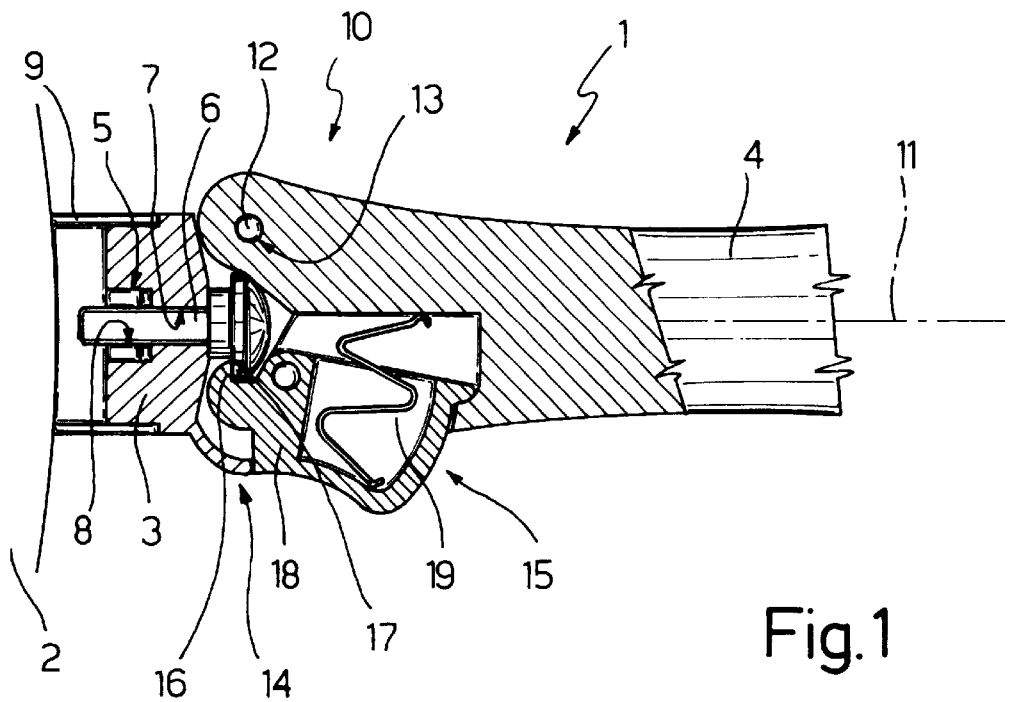
FIG. 1 shows a partially sectioned plan view of a grip device in accordance with the present invention and in the work position.
Figure 2:
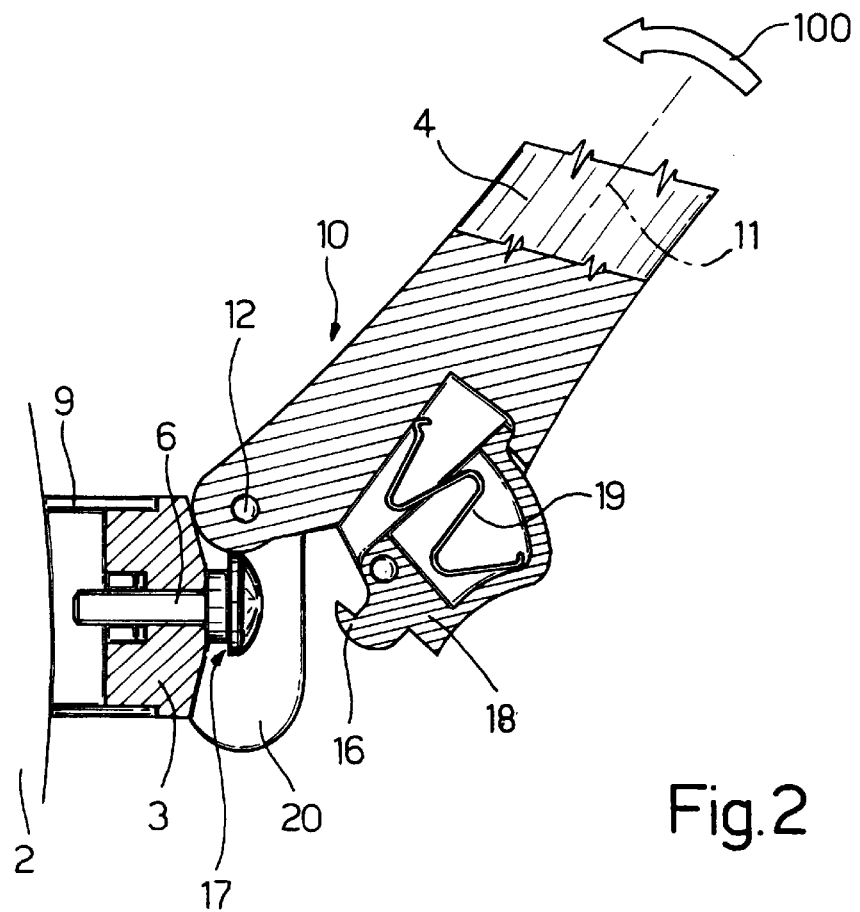
FIG. 2 shows a schematic, partially sectioned plan view of the operation of the FIG. 1 grip device.

With reference to FIGS. 1 and 2, a grip device 1 for a substantially known food cooking vessel 2—shown only partly for the sake of simplicity—comprises a root portion 3, and a grip portion 4, which may be of any shape and is shown only partly for the sake of simplicity. Root portion 3 comprises substantially known connecting means 5 for connection to vessel 2, and which integrally connect root portion 3 and vessel 2. In the non-limiting example shown in FIG. 1, for example, connecting means 5 comprise a screw 6, which fits through a seat 7 in root portion 3, and engages a threaded seat 8 formed in a projecting portion 9 of vessel 2.

According to the invention, grip device 1 also comprises hinge means 10 between root portion 3 and grip portion 4, for enabling rotation of grip portion 4 with respect to root portion 3 about a predetermined axis of rotation, which, in the example shown in FIGS. 1 and 2, is perpendicular to the drawing plane. For example, the predetermined axis of rotation about which grip portion 4 is permitted to rotate with respect to root portion 3 may, though not necessarily, be substantially perpendicular to the bottom of vessel 2 (not shown for the sake of simplicity but anyway lying substantially in the drawing plane) and to the longitudinal axis of symmetry 11 of grip portion 4. According to the invention, grip portion 4 is defined by a single one-piece element, and the entire grip portion 4 rotates as a whole with respect to root portion 3 about said predetermined axis of rotation in one predetermined rotation direction shown by arrow 100 in FIG. 2.

Hinge means 10 in turn comprise a pin 12, by which grip portion 4 of grip device 1 is connected in rotary manner to root portion 3. For example, pin 12 is integral with root portion 3 and is inserted in rotary manner inside a hole 13 in grip portion 4. Needless to say, the same rotation of grip portion 4 with respect to root portion 3 would also be achieved if pin 12 were integral with grip portion 4 and inserted in rotary manner inside a seat integral with root portion 3, or even using other types of known rotary connections.

Grip device 1 according to the invention also comprises locking means 14 for connecting grip portion 4 and root portion 3 integrally in a predetermined work position shown in FIG. 1; and control means 15 for controlling locking means 14.

In the non-limiting example shown in FIGS. 1 and 2, locking means 14 comprise a lock tooth 16 provided on grip portion 4 and for engaging a corresponding seat 17 integral with root portion 3 and defined, for example, by the head of screw 6; and control means 15 comprise a release button 18 for releasing lock tooth 16, and which is connected movably to grip portion 4 by an elastic element 19, e.g. a known spring.

Release button 18 is connected in rotary manner (e.g. by means of a pin) to grip portion 4, and integrally supports lock tooth 16, which is substantially defined by an appendix of, and is of the same thickness as, release button 18. In the preferred embodiment shown in FIGS. 1 and 2, release button 18 is housed movably between two substantially flat, parallel plates 20 (only one shown in FIGS. 1 and 2) of root portion 3.

When root portion 3 and grip portion 4 are in the work position shown in FIG. 1, release button 18 is maintained by elastic element 19 in an operating position in which lock tooth 16 engages corresponding seat 17; and elastic element 19 is elastically deformable, when release button 18 is activated to release lock tooth 16 from seat 17 and so permit rotation of grip portion 4 with respect to root portion 3 in the direction indicated by arrow 100 in FIG. 2.

Hinge means 10 enable grip portion 4 to be rotated with respect to root portion 3 from said work position shown in FIG. 1—in which grip portion 4 has a first predetermined inclination with respect to root portion 3, to a rest position in which grip portion 4 has a second predetermined inclination with respect to root portion 3. To switch from the work to the rest position and vice versa, the entire grip portion 4 is rotated as a whole with respect to root portion 3, about the predetermined axis of rotation, as shown in FIG. 2 (which does not show the rest position, which may correspond, for example, to a position in which grip portion 4 is moved as close as possible to an edge of vessel 2).

In the work position, grip portion 4 and root portion 3 are substantially aligned along axis 11 to define, as a whole, a handle by which to easily grip vessel 2. Conversely, in the rest position, in which grip portion 4 forms a predetermined angle with root portion 3, the overall size of vessel is significantly reduced.

Lock tooth 16 of grip portion 4 engages corresponding seat 17 when grip portion 4 and root portion 3 are in the work position using control means 15, and in particular by pressing and releasing release button 18, lock tooth 16 may selectively be released from and engaged inside seat 17 respectively, to permit rotation of grip portion 4 with respect to root portion 3.

Figure 3:
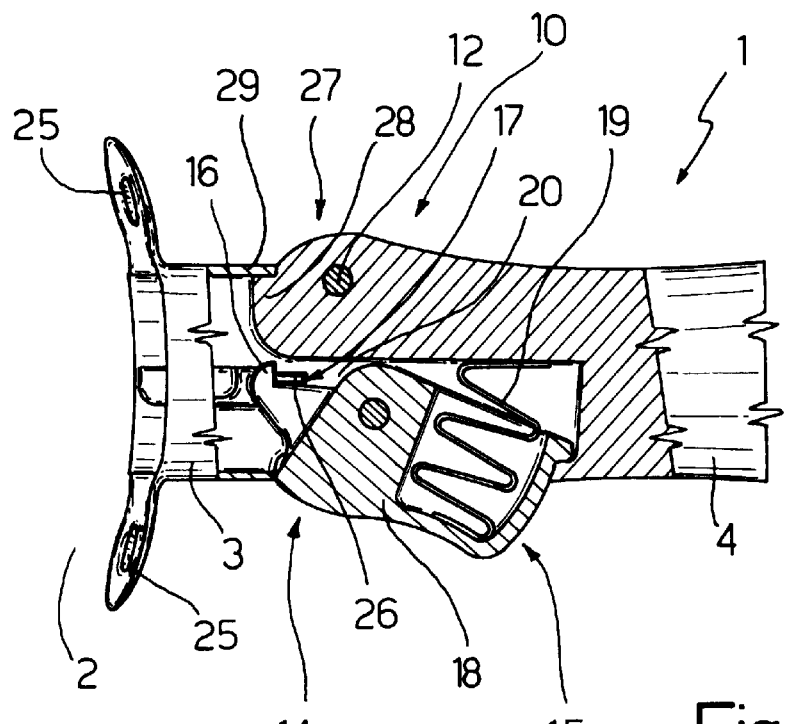
FIG. 3 shows a partially sectioned plan view of a variation of the grip device according to the invention.
Figure 4:
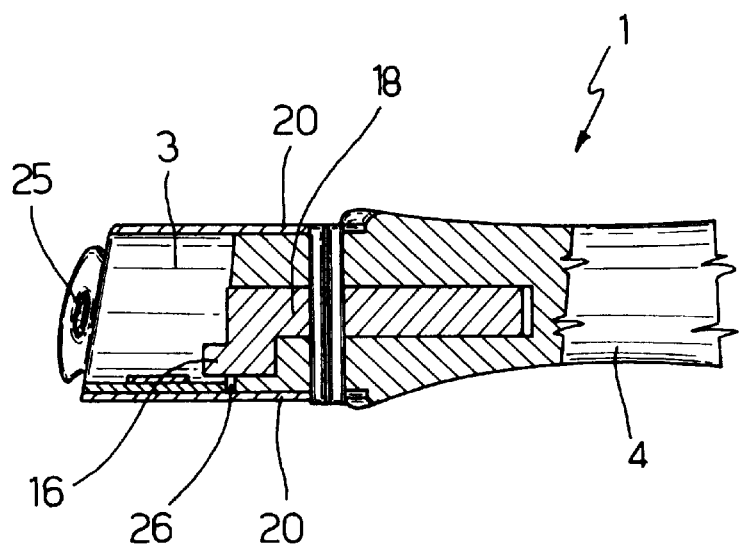
FIG. 4 shows a partially sectioned side view of the FIG. 3 variation.

FIGS. 3 and 4, in which any details similar or identical to those already described are indicated using the same numbering system, show a variation of the grip device according to the invention.

Grip device 1 again comprises a root portion 3 fitted integrally to vessel 2 in known manner (in the example shown, riveted by means of holes 25); and a grip portion 4 connected in rotary manner to root portion 3 by hinge means 10 (e.g. a pin 12).

Grip device 1 again comprises locking means 14 and relative control means 15 substantially similar to those described with reference to FIGS. 1 and 2; and lock tooth 16 is again integral with a release button 18, which is inserted in rotary manner between two substantially flat, parallel plates 20 of root portion 3. In the variation, however, lock tooth 16 is located laterally with respect to release button 18, i.e. is eccentric with respect to the axis of symmetry of release button 18, and located close to one of plates 20 of root portion 3; and seat 17 engaged by lock tooth 16 is defined by a pin 26 projecting perpendicularly from the plate 20 closest to lock tooth 16, and therefore in a direction parallel to the axis of rotation of grip portion 4 with respect to root portion 3.

In the variation, grip device 1 also comprises stop means 27 for arresting and limiting to a predetermined angle the rotation of grip portion 4 with respect to root portion 3.

More specifically, in the non-limiting example shown in FIG. 3, stop means 27 for arresting rotation of grip portion 4 with respect to root portion 3 comprise a stop portion 28 provided on grip portion 4 and which contacts a corresponding stop surface 29 on root portion 3 when grip portion 4 and root portion 3 are in the work position (shown in FIG. 3) to ensure more stabile connection of grip portion 4 and root portion 3 in the work position.

In the further variation shown in FIGS. 5 to 8, in which any details similar or identical to those already described are indicated using the same numbering system, grip device 1 again comprises a root portion 3 having standard connecting means 5 for connection to a vessel; and a grip portion 4 connected in rotary manner to root portion 3 by hinge means 10.

Root portion 3 has an inner cavity 30 defined by a substantially flat top wall 31 and a substantially flat bottom wall 32 parallel to and facing each other; top wall 31 has a pair of side by side through holes 33 symmetrical with respect to the longitudinal axis of symmetry 34 of root portion 3; and, similarly, bottom wall 32 has a pair of through holes 35 aligned respectively with holes 33 of top wall 31.

One end 37 of grip portion 4 is insertable inside cavity 30 of root portion 3; end 37 of grip portion 4 comprises two through holes 38, which, when end 37 of grip portion 4 is inserted inside cavity 30 of root portion 3, are aligned with corresponding holes 33 and 35 to define therewith two respective continuous, substantially cylindrical, parallel seats 40.

With particular reference to FIG. 5, each of holes 38 of grip portion 4 is cylindrical, and comprises an intermediate portion 43 larger in diameter than two opposite end portions 44; which difference in diameter between intermediate portion 43 and end portions 44 defines two opposite annular shoulders 45. Respective pins 46 are inserted inside holes 38, and each comprise two end heads 47 connected to each other by an elastic element 48 (e.g. a coil spring) and having respective axial shoulders 49 for engaging annular shoulders 45. In the non-limiting example shown in FIG. 5, end heads 47 are substantially cylindrical and have, on respective lateral walls, slots 51 enabling a limited amount of circumferential deformation of end heads 47. End heads 47 preferably also comprise respective caps 52, e.g. made of polymer material, located on opposite sides with respect to axial shoulders 49. Pins 46 engage continuous seats 40 and extend both inside holes 38 of grip portion 4 and holes 33 and 35 of root portion 3 to connect grip portion 4 and root portion 3; and pins 46 are elastically deformable both circumferentially, so as to click inside holes 38, and axially so as to enage/disengage holes 33 and/or 35 of root portion 3.

Figure 7:
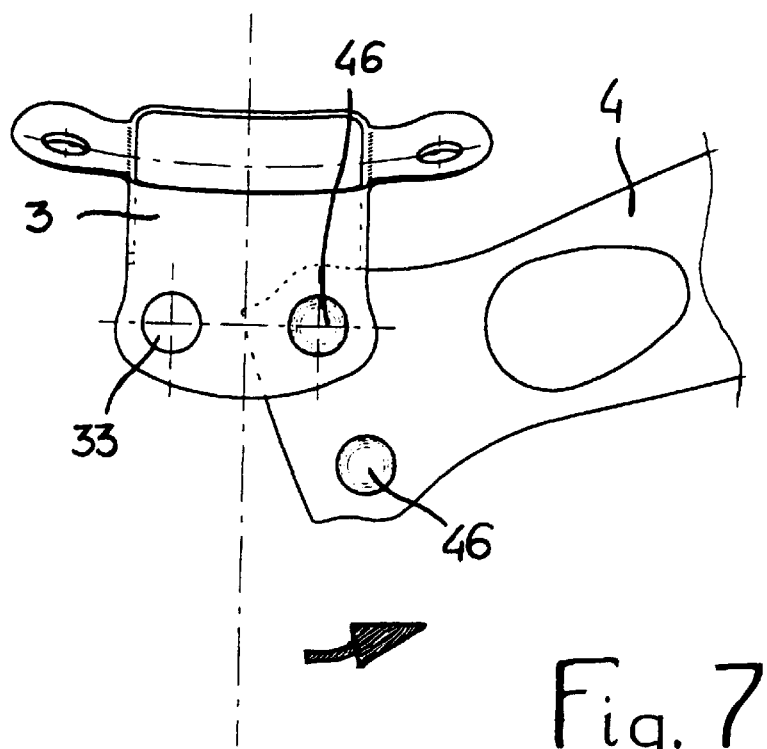
Figure 8:
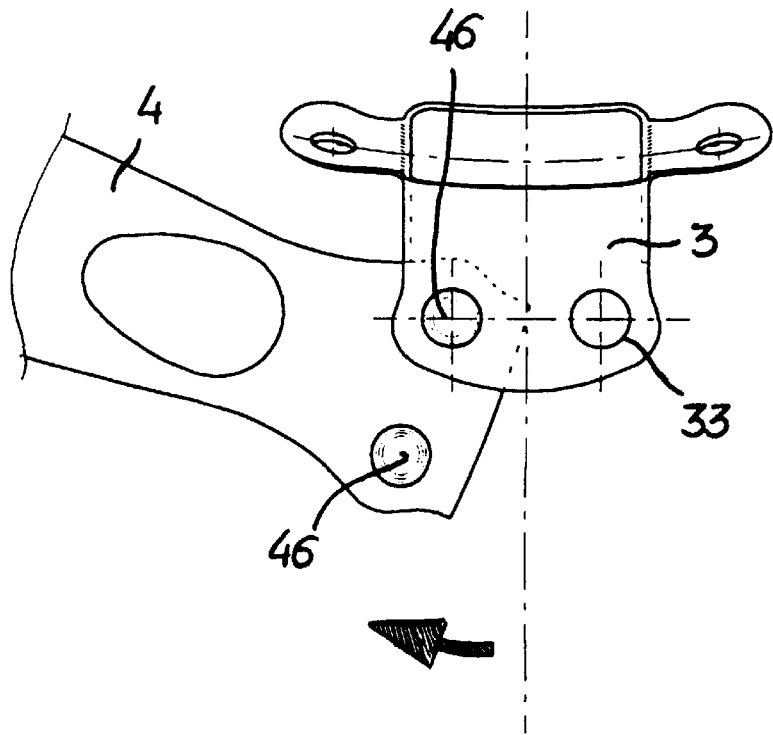

In the work position (FIG. 5), root portion 3 and grip portion 4 are therefore connected by both side by side pins 46 and therefore prevented from rotating with respect to each other. One or both of pins 46 is released from holes 33 or 35 of root portion 3 by simply pressing end heads 47 of pins 46: one of pins 46 may be released from root portion 3 (as shown in FIGS. 7 and 8) to rotate grip portion 4 with respect to root portion 3 about an axis of rotation defined by the pin 46 still connecting grip portion 4 and root portion 3, or both pins 46 may be released to detach grip portion 4 entirely from root portion 3 (as shown in FIG. 6).

Clearly, further changes may be made to the grip device described herein without, however, departing from the scope of the accompanying claims.

In particular, grip device 1 according to the invention may be applied to vessels 2 of any type; root portion 3 and grip portion 4 may be of any shape; and the axis of rotation about which grip portion 4 is permitted to rotate with respect to root portion 3 may be oriented and inclined any way with respect to vessel 2, it being understood that such rotation always occurs outside vessel 2.

Finally, the grip device according to the invention may therefore be applied to conventional vessels of any type with no particular alterations and no specially designed connecting systems required.

What is claimed is:

1. A grip device (1) for a food cooking vessel (2), in particular a frying-pan, comprising a root portion (3) and a grip portion (4), said root portion (3) having connecting means (5) for connection to said vessel (2) and which integrally connect said root portion (3) and said vessel (2); said grip portion (4) being defined by a one-piece element; the device also comprising hinge means (10) between said root portion (3) and said grip portion (4), for enabling rotation of said grip portion (4) with respect to said root portion (3) about a predetermined axis of rotation, locking means (14) for connecting said grip portion (4) integrally to said root portion (3) in a work position; and control means (15) for controlling said locking means (14); the entire said grip portion (4) rotating as a whole with respect to said root portion (3) about said predetermined axis of rotation; and said rotation of said grip portion (4) with respect to said root portion (3) about said predetermined axis of rotation occurring entirely outside said vessel (2);

wherein said locking means (14) comprise at least one lock tooth (16) provided on said grip portion (4) and for engaging a corresponding seat (17), integral with said root portion (3), when said grip portion (4) and said root portion (3) assume said work position; said control means (15) selectively causing said lock tooth (16) to engage and disengage said seat (17).

2. A grip device as claimed in claim 1, characterized in that said hinge means (10) permit said rotation of said grip portion (4), with respect to said root portion (3), from a work position in which said grip portion (4) has a first predetermined inclination with respect to said root potion (3), to a rest position in which said grip portion (4) has a second predetermined inclination with respect to said root portion (3).

3. A grip device as claimed in claim 2, characterized by also comprising stop means (27) for arresting said rotation of said grip portion (4) with respect to said root portion (3) to limit said rotation to a predetermined angle.

4. A grip device as claimed in claim 3, characterized in that said stop means (27) for arresting said rotation of said grip portion (4) with respect to said root portion (3) comprise a stop portion (28) provided on said grip portion (4) and which contacts a corresponding stop surface (29) on said root portion (3) when said grip portion (4) and said root portion (3) assume said work position.

5. A grip device as claimed in claim 1, characterized in that said control means (15) comprise a release button (18) for releasing said lock tooth (16); said release button (18) being connected movably to said grip portion (4) by an elastic element (19).

6. A grip device as claimed in claim 5, characterized in that said release button (18) is connected in rotary manner to said grip portion (4) and integrally supports said lock tooth (16); in said work position of said grip portion (4) and said root portion (3), said release button (18) being maintained by said elastic element (19) in an operating position in which said lock tooth (16) engages said seat (17); and said elastic element (19) being elastically deformable when said release button (18) is activated to release said lock tooth (16) from said seat (17) and permit rotation of said grip portion (4) with respect to said root portion (3).

7. A grip device as claimed in claim 1, characterized by comprising at least one first hole (38) formed through said grip portion (4), and at least one second hole (33) formed through said root portion (3); said at least one first (38) and at least one second (33) hole being aligned with each other to define a continuous seat (40) for insertion of said at least one pin (46); said at least one pin (46) comprising respective end heads (47) connected mutually by an elastic element (48) and having respective axial shoulders (49) for engaging corresponding annular shoulders (45) formed inside said continuous seat (40) to prevent withdrawal of said at least one pin (46) from said continuous seat (40).

8. A grip device as claimed in claim 1, characterized by comprising a first pair of holes (38) formed at one end (37) of said grip portion (4) and located side by side on opposite sides of a longitudinal axis of symmetry of said grip portion (4); said root portion having an inner cavity (30) for insertion of said end (37) of said grip portion (4); said cavity (30) being defined by opposite walls (31, 32) having respective second pairs of through holes (33) arranged so as to define, together with said first pair of holes (38) of said grip portion (4), respective continuous seats (40) for insertion of respective pins (46); each of said pins (46) inserted inside the respective continuous seat (40) defining a corresponding connection and rotation point between said grip portion (4) and said root portion (3).

9. A food cooking vessel, in particular a frying-pan type, characterized by comprising a grip device as claimed in claim 1.

10. A grip device (1) for a food cooking vessel (2), in particular a frying-pan, comprising a root portion (3) and a grip portion (4), said root portion (3) having connecting means (5) for connection to said vessel (2) and which integrally connect said root portion (3) and said vessel (2); said grip portion (4) being defined by a one-piece element; the device also comprising hinge means (10) between said root portion (3) and said grip portion (4), for enabling rotation of said grip portion (4) with respect to said root portion (3) about a predetermined axis of rotation, locking means (14) for connecting said grip portion (4) integrally to said root portion (3) in a work position; and control means (15) for controlling said locking means (14); the entire said grip portion (4) rotating as a whole with respect to said root portion (3) about said predetermined axis of rotation; and said rotation of said grip portion (4) with respect to said root portion (3) about said predetermined axis of rotation occurring entirely outside said vessel (2);

wherein said hinge means (10) comprise at least one pin (46) carried integrally by said grip portion (4) and laterally spaced apart from the longitudinal axis of symmetry (34) of root portion (3), said pin comprising two end heads (47) connected to each other by an elastic element (48) in such a way that pin (46) is elastically deformable axially and its axial length of can be varied to selectively engage/disengage at least one respective hole (33, 35) formed on said root portion (3).

* * * * *